(12) United States Patent
Johnson et al.

(10) Patent No.: US 7,059,615 B2
(45) Date of Patent: Jun. 13, 2006

(54) LOCKING MECHANISM AND METHOD FOR A MOWER-SULKY UNIT

(76) Inventors: Glenn Johnson, 1203 Stelton Rd., Piscataway, NJ (US) 08854; Kevin Mak, 1203 Stelton Rd., Piscataway, NJ (US) 08854; John Pallay, 1203 Stelton Rd., Piscataway, NJ (US) 08854

( * ) Notice: Subject to any disclaimer, the term of this patent is extended or adjusted under 35 U.S.C. 154(b) by 159 days.

(21) Appl. No.: 10/837,112

(22) Filed: Apr. 30, 2004

(65) Prior Publication Data

US 2005/0242533 A1 Nov. 3, 2005

(51) Int. Cl.
*B62D 63/00* (2006.01)

(52) U.S. Cl. .................. 280/32.7; 280/479.3

(58) Field of Classification Search .............. 280/32.7, 280/492, 493, 494, 498, 489, 479.3, 411.1, 280/447; 172/257, 433
See application file for complete search history.

(56) References Cited

U.S. PATENT DOCUMENTS

| | | | | |
|---|---|---|---|---|
| 2,721,087 A | * | 10/1955 | Pearson | 280/447 |
| 3,099,462 A | * | 7/1963 | Lent | 280/479.3 |
| 3,485,314 A | * | 12/1969 | Herr | 180/19.1 |
| 3,580,612 A | * | 5/1971 | Pearson | 280/492 |
| 4,125,272 A | * | 11/1978 | Putnam et al. | 280/479.3 |
| 4,215,875 A | * | 8/1980 | Younger | 280/479.3 |
| 4,254,969 A | * | 3/1981 | Martin | 280/479.3 |
| 4,828,282 A | * | 5/1989 | Pinto | 280/32.7 |
| 5,004,251 A | * | 4/1991 | Velke et al. | 280/32.7 |
| 5,413,364 A | * | 5/1995 | Hafendorfer | 280/32.7 |
| 5,423,565 A | * | 6/1995 | Smith | 280/411.1 |
| 5,630,606 A | * | 5/1997 | Ryan | 280/479.3 |
| 5,697,623 A | * | 12/1997 | Bermes et al. | 280/32.7 |
| 5,947,490 A | * | 9/1999 | Munnoch et al. | 280/32.7 |
| 5,975,552 A | * | 11/1999 | Slaton | 280/478.1 |
| 6,000,705 A | * | 12/1999 | Velke | 280/32.7 |
| 6,234,495 B1 | * | 5/2001 | Velke | 280/32.7 |
| 6,637,760 B1 | * | 10/2003 | Carman | 280/32.7 |
| 6,692,010 B1 | | 2/2004 | Johnson et al. | |
| 6,874,796 B1 | * | 4/2005 | Mercurio | 280/32.7 |

* cited by examiner

*Primary Examiner*—Christopher P. Ellis
*Assistant Examiner*—Christopher Bottorff
(74) *Attorney, Agent, or Firm*—Robert Stephen Salzman

(57) ABSTRACT

A sulky apparatus and method are described. The sulky rides behind a self-propelled mower. The sulky apparatus allows the mower operator to ride behind the mower, as the self-propelled mower is guided about a lawn. Common to the sulky apparatus is a swing arm that extends from the mower to the sulky. The invention comprises a locking mechanism including a footpad having an elongated locating pin extending from the footpad. The pin acts against a coil spring. The operator while continuing to stand on the sulky, forces the footpad and pin against the bias of the coil spring. The pin is then projected into an aperture disposed in a top portion of the sulky, thus locking the mower and sulky together in straight position alignment. Once locked, the mower and sulky can be driven in reverse.

1 Claim, 1 Drawing Sheet

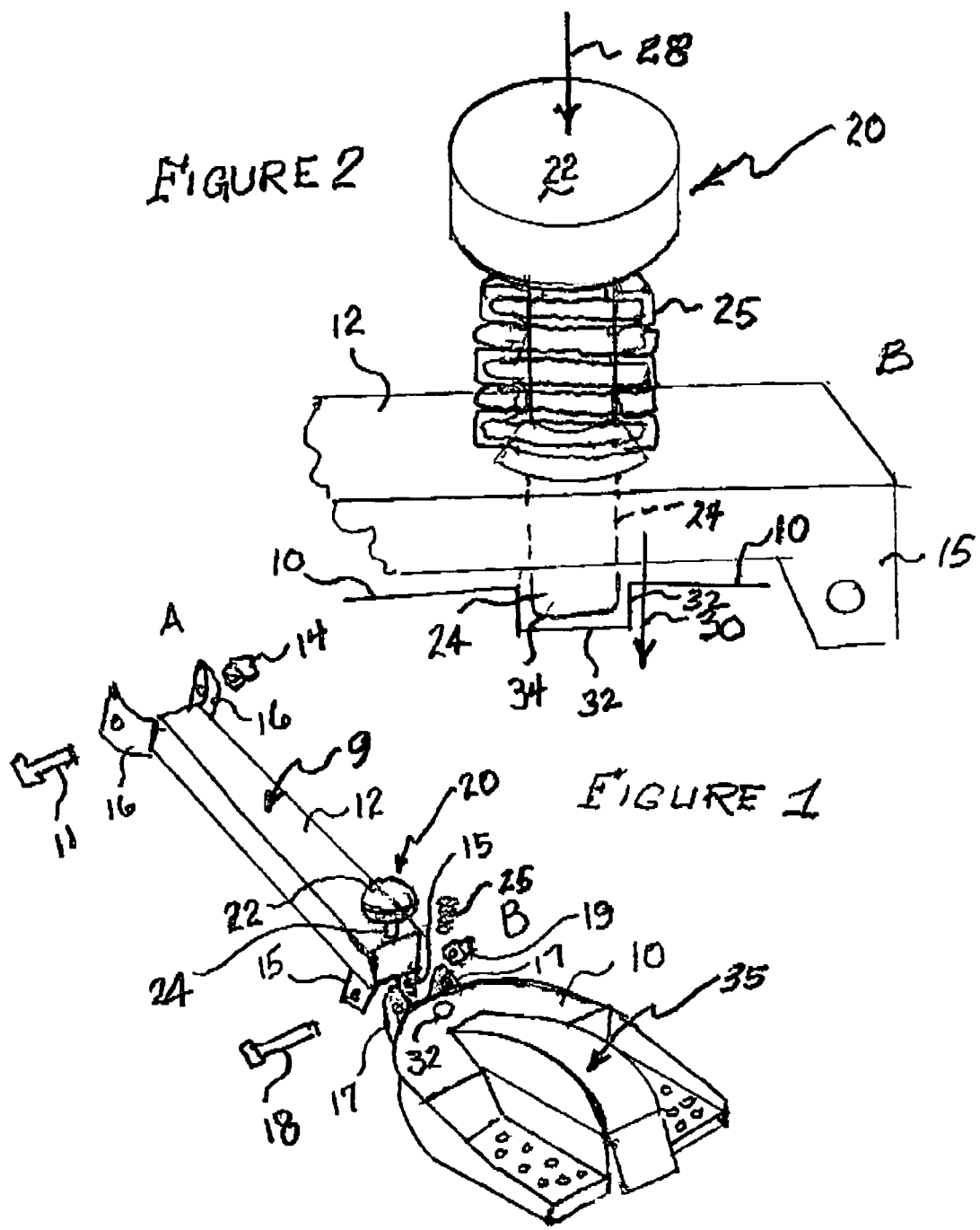

LOCKING MECHANISM AND METHOD FOR A MOWER-SULKY UNIT

FIELD OF THE INVENTION

RELATED PATENT

In U.S. Pat. No. 6,692,010 B1; Issued to: Johnson et al on Feb. 17, 2004, for: Safety Sulky for Power Mowers, a sulky apparatus is described for allowing a mower operator to ride behind a self-propelled mower. The present invention desires to improve upon this parent patent, and suggests that any teachings be incorporated in this application by way of reference.

BACKGROUND OF THE INVENTION

The object of a sulky for self-propelled lawn mowers is to provide comfort to the operator by eliminating the need to walk behind the mower. The aforementioned Patent No. 6,692,010 B1 describes a safety device, which prevents the cab of the sulky from swinging beneath the mower when riding upon an angled cutting surface. Also mentioned therein, is a locking mechanism for reverse travel. Operating in reverse mode has always been a difficult maneuver for mower and sulky combinations, due to the articulating nature of the sulky relative to the mower. Most prior art units required that the operator step off the sulky in order to adjust a locking device. This locking mechanism, when properly activated allowed the sulky to move in a straight line in a backwards direction.

The locking device of this invention allows the operator of the mower to lock the sulky-mower unit in a straight line without stepping off the sulky cab. This is not only more convenient, but is also much safer. Not having to descend from the sulky, prevents missteps, injury, and possible mower blade contact.

Unfortunately, the aforementioned patent did not fully disclose, nor show in sufficient detail, how the present locking device operates. Neither did the aforesaid patent explain how the operator can activate the locking device, and reverse the sulky-mower unit, while continuously standing upon the sulky cab. It is one object of the current invention to illustrate and describe the locking device mentioned therein, and to show a method of how the sulky-mower unit can be locked without having the operator step off the sulky.

The locking device of this invention comprises a pin and Integral footpad. The footpad and pin are mounted upon a distal end of an elongated swing arm movably attached to the mower. An operator wishing to engage the locking device in order to provide backward travel, is instructed to press downwardly upon the footpad with one foot, while standing on the sulky cab with the other foot. Pressing on the footpad projects the elongated pin into a hole disposed upon the surface of the sulky cab. There is a problem, however, with moving in reverse due to a very tight tolerance in locating the pin into the sulky hole. Attempts to manually align the pin in a reverse mode are difficult, cumbersome, and awkward. Reversing a sulky tends to disrupt the straight-line between the sulky and the swing arm, making it almost impossible in locating the locking pin. Therefore, it has been discovered, that the mower must first be driven forward a slight distance, in order to straighten the swing arm alignment with respect to the sulky. Then, it is possible to step down upon the footpad of the locking pin, and project the pin into the aperture of the sulky. Thereafter, the operator holds the footpad and pin down against a biasing spring attached to the swing arm with one foot, while balancing himself with the other foot positioned in the sulky cab. The operator is then free to reverse the mower for backward travel. Decals disposed on the upper surfaces of the sulky cab and swing arm present a useful guide for visually aligning the sulky and swing arm in the forward mode, if the forward motion does not automatically align the swing arm and sulky into a straight line.

SUMMARY OF THE INVENTION

The invention features a method and apparatus for a sulky and mower unit, including a mechanism for operating the unit in the reverse mode. Operating the sulky and mower unit in reverse requires that the sulky be restrained from deviating from a straight line. Operating in reverse without locking the sulky mower unit in a straight line tends to skew the sulky about the connecting arm of the mower. The method of the invention requires a first step of traveling a short distance in the forward mode to align the sulky and connecting arm to a straight position. The forward motion sufficiently aligns the sulky cab with the connecting arm so that a locking mechanism can be engaged. It is then possible to activate the locking mechanism, while still standing upon the sulky cab. Then, the operator can power the mower into reverse without stepping off the sulky. Decals disposed on the upper surfaces of the connecting arm and sulky cab centerpiece, can assist with the forward alignment, should the short travel distance in the forward mode does not automatically align the unit.

The locking mechanism of this invention comprises a footpad, which is suspended over the distal end of the connecting arm of the mower. A locating pin is attached to the underside of the footpad. A coil spring disposed about the locating pin, biases the footpad in an upward position. Pressing downwardly upon the footpad against the biasing, causes the locating pin to move past the end of the connecting arm and into an aperture in the sulky cab. This locks the connecting arm to the sulky cab. The locating pin can be rounded, tapered or chamfered on its lower end, in order to assist the locating pin in seeking the sulky cab aperture.

It is an object of this invention to provide a method and apparatus by which a sulky-mower unit can be operated in a reverse mode.

It is another object of the present invention to provide a reverse mode locking mechanism that can be actuated by the operator of a sulky-mower unit, while standing upon the sulky.

BRIEF DESCRIPTION OF THE DRAWINGS

A complete understanding of the present invention may be obtained by reference to the accompanying drawings, when considered in conjunction with the subsequent detailed description, in which.

Like elements and components will bear the same numbering and designations throughout the FIGURES.

DESCRIPTION OF THE PREFERRED EMBODIMENT

Generally speaking, the invention relates to a locking mechanism and method for operating a mower-sulky unit in reverse. The sulky rides behind a self-propelled mower. The sulky apparatus allows the mower operator to ride behind the mower, as the self-propelled mower is guided about a lawn. Common to the sulky apparatus is a swing arm that extends from the mower to the sulky. The invention comprises a locking mechanism including a footpad having an elongated locating pin extending from the footpad. The pin acts against a coil spring. The operator forces the footpad and pin against the bias of the coil spring, and projects the pin from the connecting arm, into an aperture disposed in the top portion of the sulky. This locks the mower and sulky together in straight-line alignment. Once locked, the mower and sulky can be driven in reverse.

Figure 1:
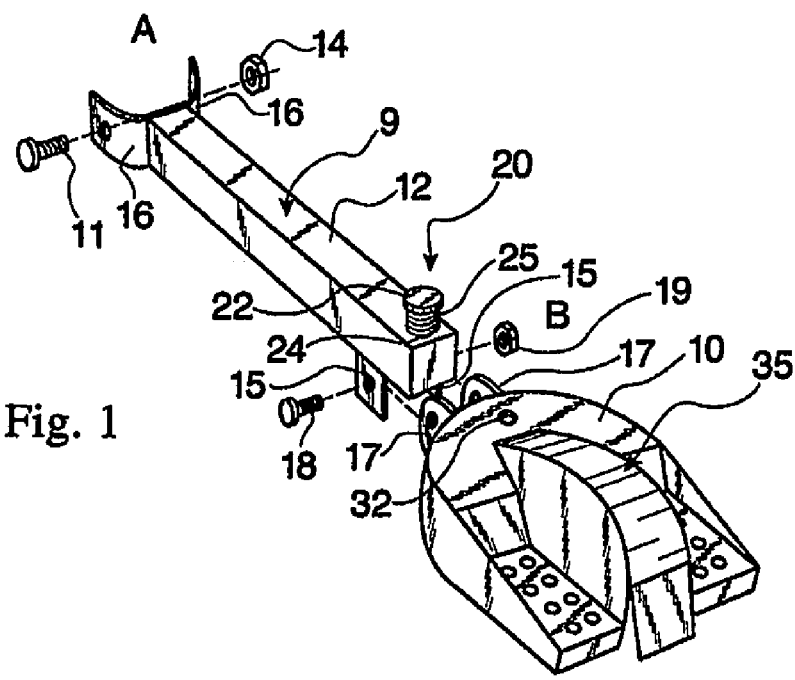
FIG. 1 illustrates an exploded perspective view of the sulky cab and connecting arm, and the footpad and pin locking mechanism of this invention.
Figure 2:
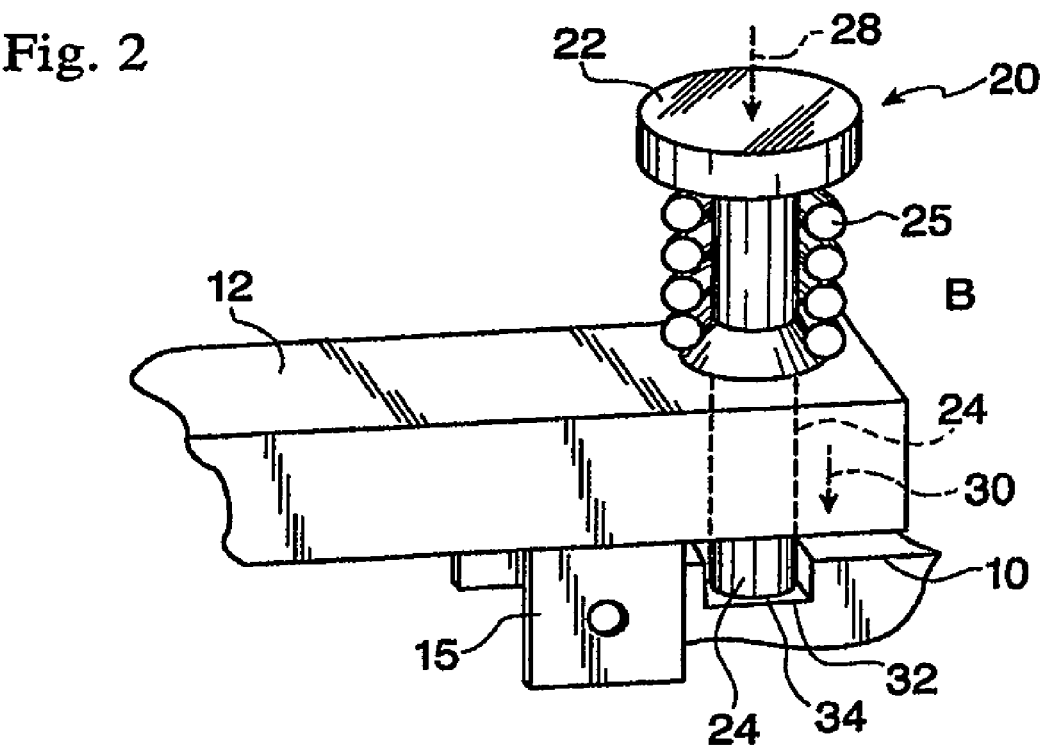
Figure 1:
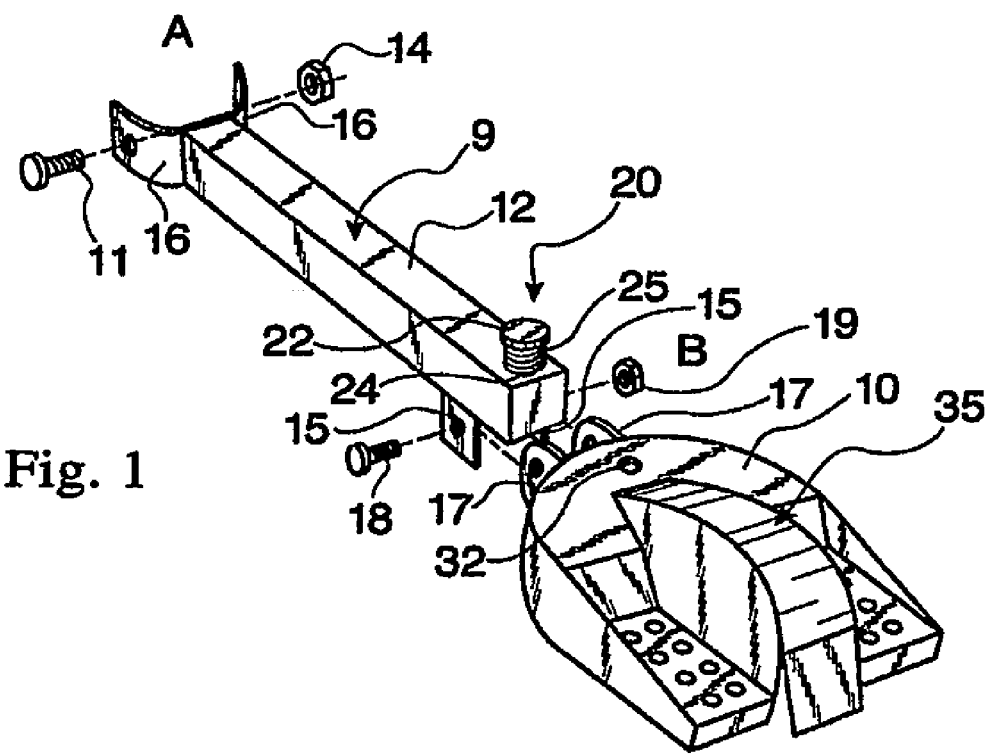

Now referring to FIG. 1, a perspective view of a riding sulky 10 and a connecting arm 12, are illustrated. The connecting arm has a pair of gripping lugs 16 at its forward distal end "A", which attach to a mower (not shown), by means of a bolt 11 and lock nut 14. The rear distal end "B" of the connecting arm 12, has a pair of attachment lugs 15 that mate with a pair of attachment lugs 17 disposed at the front end of the sulky 10. The bolt 18 passes through the lugs 15 and 17, respectively, and is secured by lock nut 19. The bolt 18 secures the connecting arm 12 to the sulky 10.

Figure 2:
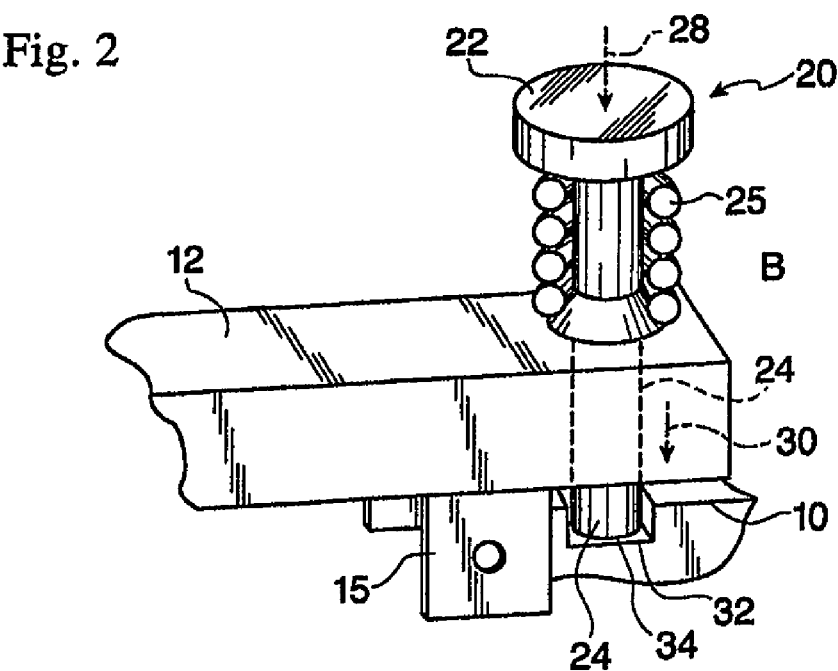
FIG. 2 depicts an enlarged, detailed, perspective, partial view of a distal end of the connecting arm and locking mechanism, shown in FIG. 1.

The locking mechanism 20 of this invention is located at distal end "B" of the connecting arm 12, as shown generally in FIG. 1, and in more detail in the partial, cut-away view depicted in FIG. 2.

Referring to FIG. 2, the locking mechanism 20 comprises a footpad 22, which is suspended over the distal end "B" of the connecting arm 12. An elongated, locating pin 24 is attached to the underside of the footpad 22, and extends through the connecting arm 12. A coil spring 25 disposed about the locating pin 24 (shown in cut-away view), biases the footpad 22 in an upward position. By pressing downwardly (arrow 28) upon the footpad 22 against the biasing of coil spring 25, the locating pin 24 is caused to move past the end of the connecting arm 12 (arrow 30), and into an aperture 32 of the sulky 10, as shown in FIG. 1. This locks the connecting arm 12 to the sulky 10. The locating pin 24 can be rounded, tapered or chamfered on its lower end 34, in order to assist the locating pin 24 in seeking the sulky aperture 32.

Decals can be applied to the upper surface 35 of the sulky 10, and the upper surface 9 of the connecting arm 12, in order to assist in the straight-line alignment between the connecting arm 12 and the sulky 10, as will be explained in more detail, hereinafter.

Operation of the Sulky in the Reverse Mode

An operator wishing to engage the locking device 20 in order to provide backward travel, is instructed to press downwardly upon the footpad 22 with one foot, while standing on the sulky 10 with the other foot. Pressing upon the footpad 22 projects the elongated pin 24 into a hole 32 disposed upon the surface of the sulky 10. There is a problem, however, with moving in reverse due to a very tight tolerance between the locating pin 24 and the sulky hole 32. Attempts to manually align the pin 24 in a reverse mode are difficult, cumbersome, and awkward. Reversing a sulky 10 tends to disrupt the straight position between the sulky 10, and the connecting arm 12 thus, making it almost impossible in projecting the locating pin 24 into hole 32. Therefore, it has been discovered, that the mower (not shown) must first be driven forward a slight distance, in order to straighten the connecting arm 12 alignment with respect to the sulky 10. Then, it is possible to step down upon the footpad 22, and project (arrow 30) the locating pin 24 into aperture 32.

Thereafter, the operator holds the footpad 22 and locating pin 24 downwardly against the biasing of coil spring 25 attached to the connecting arm 12 with one foot, while balancing oneself with the other foot positioned in the sulky 10. The operator is then free to reverse the mower for backward travel. Decals disposed on the upper surfaces 35 and 9, respectively of the sulky 10 and the connecting arm 12 present a useful guide for visually aligning the sulky and connecting arm in the forward mode, in the event that the forward motion does not automatically align the connecting arm and sulky into a straight position.

Since other modifications and changes varied to fit particular operating requirements and environments will be apparent to the skilled practitioner of this art, the invention is not considered limited to the example given for purposes of disclosure, but rather is deemed to cover all changes and modifications which do not constitute departures from the true spirit and scope of the invention.

Having thus described the invention, what is desired to be protected by Letters Patent is presented in the subsequently appended claims.

The invention claimed is:

1. A method of operating a sulky-mower unit in reverse, comprising the steps of:
    (a) while standing upon a sulky of said sulky-mower unit with a first foot, aligning said sulky with a connecting arm attached to a mower of said sulky-mower unit to form a substantially straight position between said sulky and said connecting arm of said mower; said alignment being achieved by moving said sulky-mower unit forward;
    (b) while continuing to stand upon said sulky with said first foot, actuating a device for securing alignment of said sulky and said connecting arm by standing upon a locking mechanism with a second foot; and
    (c) reversing said sulky-mower unit.

* * * * *

UNITED STATES PATENT AND TRADEMARK OFFICE
CERTIFICATE OF CORRECTION

PATENT NO. : 7,059,615 B2 Page 1 of 2
APPLICATION NO. : 10/837112
DATED : June 13, 2006
INVENTOR(S) : Glenn Johnson, Kevin Mak and John Pallay It is certified that error appears in the above-identified patent and that said Letters Patent is hereby corrected as shown below:

Delete Drawing Figs. 1-2, and substitute therefor the Drawing Sheets consisting of Figs. 1-2 as shown on the attached pages.

Signed and Sealed this

Fourth Day of September, 2007

JON W. DUDAS
*Director of the United States Patent and Trademark Office*

U.S. Patent    Jun. 13, 2006    Sheet 1 of 1    7,059,615 B2

UNITED STATES PATENT AND TRADEMARK OFFICE
CERTIFICATE OF CORRECTION

| | | |
|---|---|---|
| PATENT NO. | : 7,059,615 B2 | |
| APPLICATION NO. | : 10/837112 | |
| DATED | : June 13, 2006 | |
| INVENTOR(S) | : Glenn Johnson, Kevin Mak and John Pallay | |

It is certified that error appears in the above-identified patent and that said Letters Patent is hereby corrected as shown below:

Delete the title page and substitute therefor the attached title page.

Delete Drawing Figs. 1-2, and substitute therefor the Drawing Sheets consisting of Figs. 1-2 as shown on the attached pages.

This certificate supersedes Certificate of Correction issued September 4, 2007.

Signed and Sealed this

Twenty-third Day of October, 2007

JON W. DUDAS
*Director of the United States Patent and Trademark Office*

(12) United States Patent
Johnson et al.

(10) Patent No.: US 7,059,615 B2
(45) Date of Patent: Jun. 13, 2006

(54) LOCKING MECHANISM AND METHOD FOR A MOWER-SULKY UNIT

(76) Inventors: Glenn Johnson, 1203 Stelton Rd., Piscataway, NJ (US) 08854; Kevin Mak, 1203 Stelton Rd., Piscataway, NJ (US) 08854; John Pallay, 1203 Stelton Rd., Piscataway, NJ (US) 08854

( * ) Notice: Subject to any disclaimer, the term of this patent is extended or adjusted under 35 U.S.C. 154(b) by 159 days.

(21) Appl. No.: 10/837,112

(22) Filed: Apr. 30, 2004

(65) Prior Publication Data
US 2005/0242533 A1    Nov. 3, 2005

(51) Int. Cl.
*B62D 63/00* (2006.01)

(52) U.S. Cl. .................................. 280/32.7; 280/479.3

(58) Field of Classification Search ............. 280/32.7, 280/492, 493, 494, 498, 489, 479.3, 411.1, 280/447; 172/257, 433
See application file for complete search history.

(56) References Cited
U.S. PATENT DOCUMENTS

| | | | | | |
|---|---|---|---|---|---|
| 2,721,087 | A | * | 10/1955 | Pearson | 280/447 |
| 3,099,452 | A | * | 7/1963 | Lent | 280/479.3 |
| 3,485,314 | A | * | 12/1969 | Herr | 180/19.1 |
| 3,580,612 | A | * | 5/1971 | Pearson | 280/492 |
| 4,125,272 | A | * | 11/1978 | Putnam et al. | 280/479.3 |
| 4,215,875 | A | * | 8/1980 | Younger | 280/479.3 |
| 4,254,969 | A | * | 3/1981 | Martin | 280/479.3 |
| 4,828,282 | A | * | 5/1989 | Pinto | 280/32.7 |
| 5,004,251 | A | * | 4/1991 | Velke et al. | 280/32.7 |
| 5,413,364 | A | * | 5/1995 | Hafendorfer | 280/32.7 |
| 5,423,565 | A | * | 6/1995 | Smith | 280/411.1 |
| 5,630,606 | A | * | 5/1997 | Ryan | 280/479.3 |
| 5,697,623 | A | * | 12/1997 | Bermes et al. | 280/479.3 |
| 5,947,490 | A | * | 9/1999 | Muennich et al. | 280/32.7 |
| 5,975,552 | A | * | 11/1999 | Slaton | 280/478.1 |
| 6,000,705 | A | * | 12/1999 | Velke | 280/32.7 |
| 6,234,495 | B1 | * | 5/2001 | Velke | 280/32.7 |
| 6,637,760 | B1 | * | 10/2003 | Carman | 280/32.7 |
| 6,692,010 | B1 | | 2/2004 | Johnson et al. | |
| 6,874,796 | B1 | * | 4/2005 | Mercurio | 280/32.7 |

* cited by examiner

*Primary Examiner*—Christopher P. Ellis
*Assistant Examiner*—Christopher Bottorff
(74) *Attorney, Agent, or Firm*—Robert Stephen Salzman

(57) ABSTRACT

A sulky apparatus and method are described. The sulky rides behind a self-propelled mower. The sulky apparatus allows the mower operator to ride behind the mower, as the self-propelled mower is guided about a lawn. Common to the sulky apparatus is a swing arm that extends from the mower to the sulky. The invention comprises a locking mechanism including a footpad having an elongated locating pin extending from the footpad. The pin acts against a coil spring. The operator while continuing to stand on the sulky, forces the footpad and pin against the bias of the coil spring. The pin is then projected into an aperture disposed in a top portion of the sulky, thus locking the mower and sulky together in straight position alignment. Once locked, the mower and sulky can be driven in reverse.

1 Claim, 1 Drawing Sheet

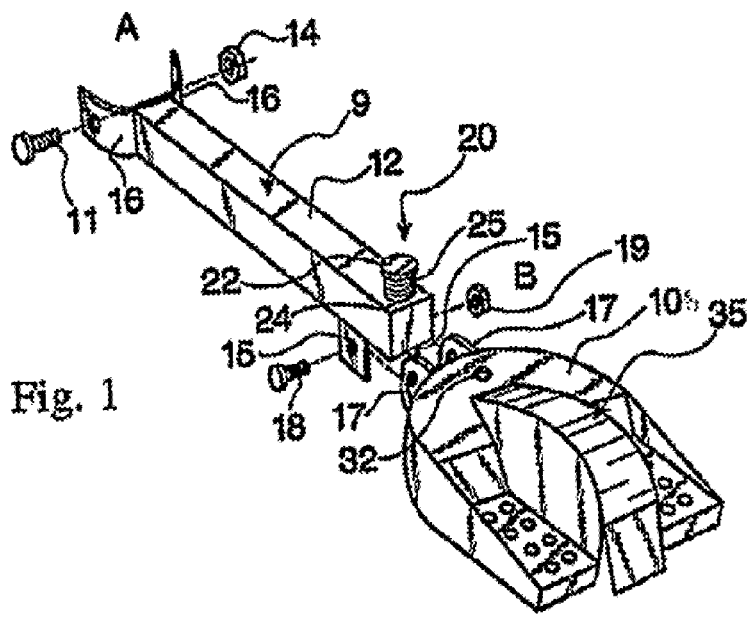

Fig. 1